US012701117B2

(12) United States Patent
    Hojjati

(10) Patent No.: US 12,701,117 B2
(45) Date of Patent: Aug. 4, 2026

(54) PRE-VALIDATING AN EMAIL RECIPIENT AND DOMAIN

(71) Applicant: DigiCert, Inc., Lehi, UT (US)

(72) Inventor: Avesta Hojjati, Austin, TX (US)

(73) Assignee: DigiCert, Inc., Lehi, UT (US)

( * ) Notice: Subject to any disclaimer, the term of this patent is extended or adjusted under 35 U.S.C. 154(b) by 278 days.

(21) Appl. No.: 18/455,069

(22) Filed: Aug. 24, 2023

(65) Prior Publication Data

US 2025/0071113 A1    Feb. 27, 2025

(51) Int. Cl.
    H04L 9/40        (2022.01)
    H04L 51/48       (2022.01)
(52) U.S. Cl.
    CPC .......... H04L 63/0884 (2013.01); H04L 51/48 (2022.05); H04L 63/0823 (2013.01)
(58) Field of Classification Search
    CPC . H04L 63/0884; H04L 51/48; H04L 63/0823; H04L 51/23
    See application file for complete search history.

(56) References Cited

U.S. PATENT DOCUMENTS

| | | | | |
|---|---|---|---|---|
| 7,689,654 | B2 * | 3/2010 | Walter | .................... H04L 51/48 |
| | | | | 713/176 |
| 7,987,500 | B2 | 7/2011 | Rosenberg | |
| 8,028,162 | B2 | 9/2011 | Beattie et al. | |
| 8,468,583 | B2 | 6/2013 | Andrews | |
| 8,700,903 | B2 | 4/2014 | Hsueh et al. | |
| 8,826,395 | B2 | 9/2014 | Bretschneider et al. | |

| | | | |
|---|---|---|---|
| 9,055,059 | B1 | 6/2015 | Bhalerao et al. |
| 9,100,191 | B2 | 8/2015 | Liu et al. |
| 9,219,611 | B1 | 12/2015 | Naik |
| 9,258,128 | B1 | 2/2016 | Tytula et al. |
| 9,276,887 | B2 | 3/2016 | Jalisatgi et al. |
| 9,338,012 | B1 | 5/2016 | Naik et al. |
| 9,350,536 | B2 | 5/2016 | Sabin |
| 9,374,229 | B1 | 6/2016 | Schwengler et al. |
| 9,479,338 | B2 | 10/2016 | Sabin |
| 9,537,854 | B2 | 1/2017 | Verma |
| 9,594,477 | B1 | 3/2017 | Ardakani et al. |
| 9,680,819 | B2 | 6/2017 | Liu et al. |
| 9,769,046 | B2 | 9/2017 | Sabin |

(Continued)

OTHER PUBLICATIONS

E. Ogao, "US military emails sent to Mali because of common typo," ABC News, https://abcnews.go.com/International/us-military-emails-mail-common-typo/story?id=101516063, Jul. 20, 2023, 3 pages.

*Primary Examiner* — Joe Chacko
(74) *Attorney, Agent, or Firm* — Baratta Law PLLC; Lawrence A. Baratta, Jr.

(57) ABSTRACT

Systems and methods for validating email recipients are provided. A method, according to one implementation, includes a step of obtaining a recipient email address entered in an address field of an email message that is being composed by a sender. The method also includes a step of checking validity of the recipient email address and a domain associated with the recipient email address, to identify one or more possible issues in the recipient email address before the email message is sent. The present disclosure can be implemented by an email coordinator service. Advantageously, an email does not leave the sender's possession until there is a validation of the recipient's address and domain.

20 Claims, 6 Drawing Sheets

(56)  References Cited

U.S. PATENT DOCUMENTS

| | | | |
|---|---|---|---|
| 10,277,580 B1 | 4/2019 | Klieman et al. | |
| 10,341,321 B2 | 7/2019 | Kumar et al. | |
| 11,184,348 B2 | 11/2021 | Bhalerao | |
| 11,251,974 B2 | 2/2022 | Liu et al. | |
| 2003/0200265 A1* | 10/2003 | Henry | H04N 1/00209 |
| | | | 709/206 |
| 2012/0240076 A1 | 9/2012 | Tuang et al. | |
| 2014/0019762 A1 | 1/2014 | Sabin | |
| 2014/0237091 A1 | 8/2014 | Sabin et al. | |
| 2019/0297079 A1* | 9/2019 | Delcourt | H04L 63/0823 |
| 2020/0036673 A1* | 1/2020 | O'Brien | H04L 51/42 |
| 2021/0056197 A1 | 2/2021 | Choules et al. | |
| 2022/0029983 A1 | 1/2022 | Klieman et al. | |
| 2022/0092168 A1 | 3/2022 | Brown et al. | |
| 2022/0103381 A1 | 3/2022 | Rowley | |
| 2022/0217154 A1* | 7/2022 | Song | H04L 51/48 |

* cited by examiner

| Intended TLD | Possible Typographical Issues | | |
|---|---|---|---|
| .com | .cm (Cameroon) | .co (Colombia) | .om (Oman) |
| .org | | | |
| .net | .ne (Niger) | .et (Ethiopia) | |
| .edu | .eu (European Union) | | |
| .gov | | | |
| .mil | .ml (Mali) | .il (Israel) | |

97

100

100

105

*120*

| OBTAIN A RECIPIENT EMAIL ADDRESS ENTERED IN AN ADDRESS FIELD OF AN EMAIL MESSAGE THAT IS BEING COMPOSED BY A SENDER | *122* |

| CHECK VALIDITY OF THE RECIPIENT EMAIL ADDRESS AND A DOMAIN ASSOCIATED WITH THE RECIPIENT EMAIL ADDRESS, TO IDENTIFY ONE OR MORE POSSIBLE ISSUES IN THE RECIPIENT EMAIL ADDRESS BEFORE THE EMAIL MESSAGE IS SENT | *124* |

PRE-VALIDATING AN EMAIL RECIPIENT AND DOMAIN

TECHNICAL FIELD

The present disclosure generally relates to electronic mail (email) systems, networks, and methods. More particularly, the present disclosure relates to validating the identity and legitimacy of an email recipient and domain before an email message is transmitted from a sender's device.

BACKGROUND

Generally, there are many types of security systems currently in use for ensuring cybersecurity within a communications network. Regarding the practice of exchanging email messages, for example, there are currently different types of systems for an email receiver to authenticate a sender of the emails. Thus, before an email receiver opens an email or opens an attachment in an email, the receiver can use various security strategies to prevent spammers, imposters, attackers, etc. from performing illicit activities with the receiver's system. However, from the opposite point of view (e.g., from the sender's point of view), there are currently no automated validation systems for checking emails before the sender actually sends an email. That is, at present, there are no solutions for enabling an email sender to validate the identity and domain of the email receiver before the email is sent. Normally, the sender simply types in an email address into an address field. However, if the sender makes any typographical errors or other such errors (e.g., incorrect domain, incorrect username, etc.), the email may get bounced back as being undeliverable. Also, at times, a bounce back notification may take several hours or days, which can be unacceptable in many situations. Other issues may cause an email server to send the email into a blackhole where it will never get delivered and the sender will never know that the email had not been delivered. In all of these cases, the email leaves the sender's possession without validating there is a proper receiver.

BRIEF SUMMARY

The present disclosure is directed to systems and methods for validating an email recipient before the sender transmits the email message and/or validating the email message before it is sent. As described herein, validating and pre-validating means a receiver and the receiver's domain is validated before the email message leaves the possession of the sender. A method, according to some implementations, includes a step of obtaining a recipient email address entered in an address field of an email message that is being composed by a sender. The method further includes a step of checking validity of the recipient email address to identify one or more possible issues in the recipient email address before the email message is sent.

According to additional embodiments, the method, upon identifying one or more possible issues in the recipient email address, may be configured to alert the sender to the one or more possible issues. In some embodiments, the method may also include the steps of a) allowing the sender to enter an option to flag the recipient email address as either valid or invalid, and b) storing a valid flag or invalid flag along with the recipient email address based on the option entered by the sender. The step of alerting the sender to the one or more possible issues may alternatively include the steps of a) communicating the one or more possible issues in a pop-up window, and b) presenting one or more selectable buttons in the pop-up window for receiving input from the sender.

The step of checking the validity of the recipient email address may include the steps of a) comparing the recipient email address with one or more email addresses previously stored in a database, and b) based on the step of comparing the recipient email address with the one or more email addresses, determining a likelihood that the recipient email address includes a typographical error. The step of determining the likelihood of a typographical error may include the step of analyzing one or more of a Top-Level Domain (TLD), a country code TLD (ccTLD), a root domain, and a look-alike domain of the recipient email address and the one or more email addresses. In some embodiments, the steps of comparing and determining may involve Machine Learning (ML) procedures.

According to some implementations, the method may also include the steps of a) extracting a domain from a first portion of the recipient email address to determine if the domain is valid and exists, and b) extracting a recipient from a second portion of the recipient email address to determine if the recipient is valid and exists. The method may also include the steps of a) determining a certification status of the domain, and b) informing the sender whether or not the domain includes a certificate issued by a Certification Authority (CA).

The method, in some embodiments, may include the steps of obtaining the recipient email address and checking the validity of the recipient email address after the sender has a) pressed a first button associated with sending the email message, b) pressed a second button associated with validating an email recipient, or c) entered the recipient email address in the address field. The method may be configured in a memory device or other suitable non-transitory computer-readable medium (e.g., in software or firmware) and may be associated with one or more plug-ins associated with one or more of a Message User Agent (MUA), a Message Submission Agent (MSA), and a Message Transfer Agent (MTA). The method may include sending the email message after validation is confirmed and the one or more possible issues have been resolved. In some implementations, the method may be executed on top of the Simple Mail Transport Protocol (SMTP).

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
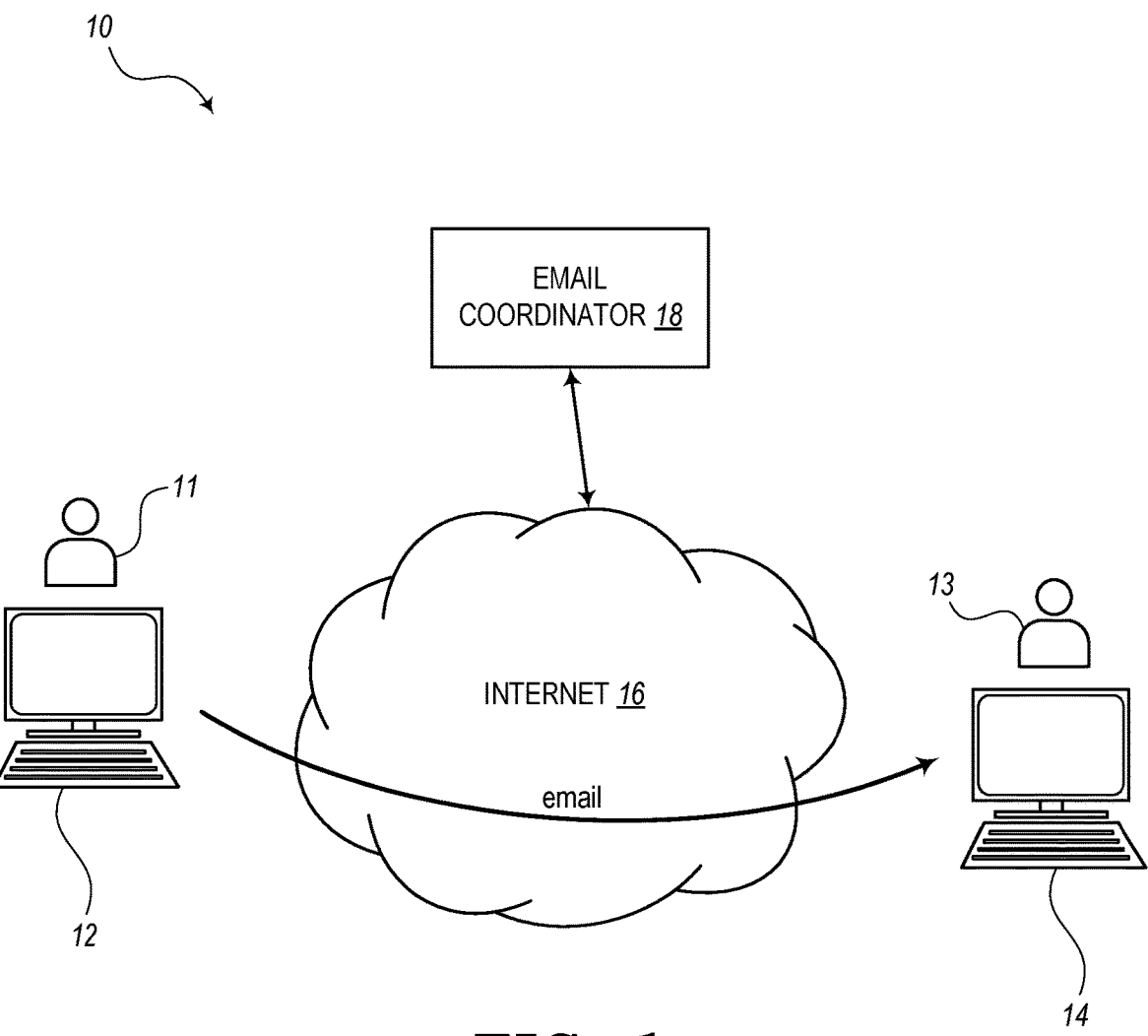
FIG. 1 is a diagram illustrating a system in which an email coordinator is used to monitor emails sent from a sender's device to a recipient's device, according to various embodiments.

The present disclosure relates to systems and methods for providing Internet security, particularly in the area of email exchanges. In particular, the systems and methods of the present disclosure are configured to validate an email recipient before the composed email leaves the sender's device. By providing this pre-validation step before sending, the sender can avoid various types of issues that are common for many users. Again, ss described herein, validating and pre-validating means a receiver and the receiver's domain is validated before the email message leaves the possession of the sender. As such, the sender knows there is a valid recipient prior to the email leaving the user's machine, device, software, etc. This validating and pre-validating can be performed by an email coordinator service.

Again, there is currently no way to validate an email recipient in advance. Thus, the present disclosure offers various solutions for providing an efficient and convenient way to enable the sender to validate the identity of the receiver (again, identity means a valid domain and a valid user in the domain) before the email message is transmitted through the Internet. Suppose, for instance, that a user intends to send an email to johndoe@xyz.com and attempts to type this address into an address field in an email program. A sender may assume that the email address is typed in correctly, but often there may be typographical errors, transcription errors, misspellings, copy and paste errors, wrong email to begin with, etc. Then, when the email is sent with errors in the email address (e.g., the domain "xyz.com" is incorrect, etc.), the email will often bounce back (e.g., undeliverable). Also, an error may be caused by the absence of a recipient (e.g., no "johndoe") or misspelling of the recipient (e.g., "jonhdoe") at the specific domain (e.g., "xyz.com"). The problem is that once the email leaves the sender's device (e.g., computer, email client, mobile phone, etc.), the sender may not know if the email was undeliverable and/or how a domain may be set up on the other end to handle undeliverable emails. For example, a domain may be set up to send a bounce back message, but the timing of this action may be unknown to the sender. Some domains may be set up where they do not provide a bounce back action but instead simply allow the email to go into a blackhole.

In a recent example, ABC News reported repeated issues occurring over a certain time period in which the US military sent tens of thousands of emails to the wrong recipients, see, e.g., abcnews.go.com/International/us-military-emails-mail-common-typo/story?id=101516063. That is, multiple users in the US military had intended to type in ".mil" at the end of an email address, referred to as the Top-Level Domain (e.g., ".com," ".org," ".net," ".edu," ".gov," and ".mil"), which would of course be internally delivered to a recipient also in the US military. However, errors in these cases resulted from the senders accidentally typing in ".ml" (i.e., leaving out the "i" in "mil"), which coincidently is interpreted by email servers as a country code TLD (ccTLD)

directed to the western African country of "Mali." Thus, the typographical error of leaving out this one character led to the misdirection of these tens of thousands of email messages to Mali. It was also reported that some of the emails contained "highly sensitive" data.

Therefore, from this example and other examples that many users have experienced at one point or another, the present disclosure describes systems and methods for including an extra step in the sending of emails. That is, the systems and methods described herein provide a pre-validation step intended to validate the address and domain of the recipient before the email leaves the sender's device. Therefore, there is a need in the field of email communication to validate an email address and domain of a recipient before an email leaves the sender's device.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 is a diagram illustrating an embodiment of a system 10 where a sender 11 intends to use a first user device 12 or "sender's device" (e.g., computer, laptop, tablet, mobile phone, etc.) to send one or more emails to a recipient 13 using a second user device 14 or "recipient's device" (e.g., computer, laptop, tablet, mobile phone, etc.) via the Internet 16. As shown in FIG. 1, the system 10 further includes an email coordinator 18 (e.g., cloud-based server) that is used to monitor emails through the Internet 16. Thus, when sender 11 intends to send an email from the first user device 12 to the second user device 14, the email coordinator 18 is configured to check the validity of the recipient's email address before the email leaves the sender's device.

Figure 2:
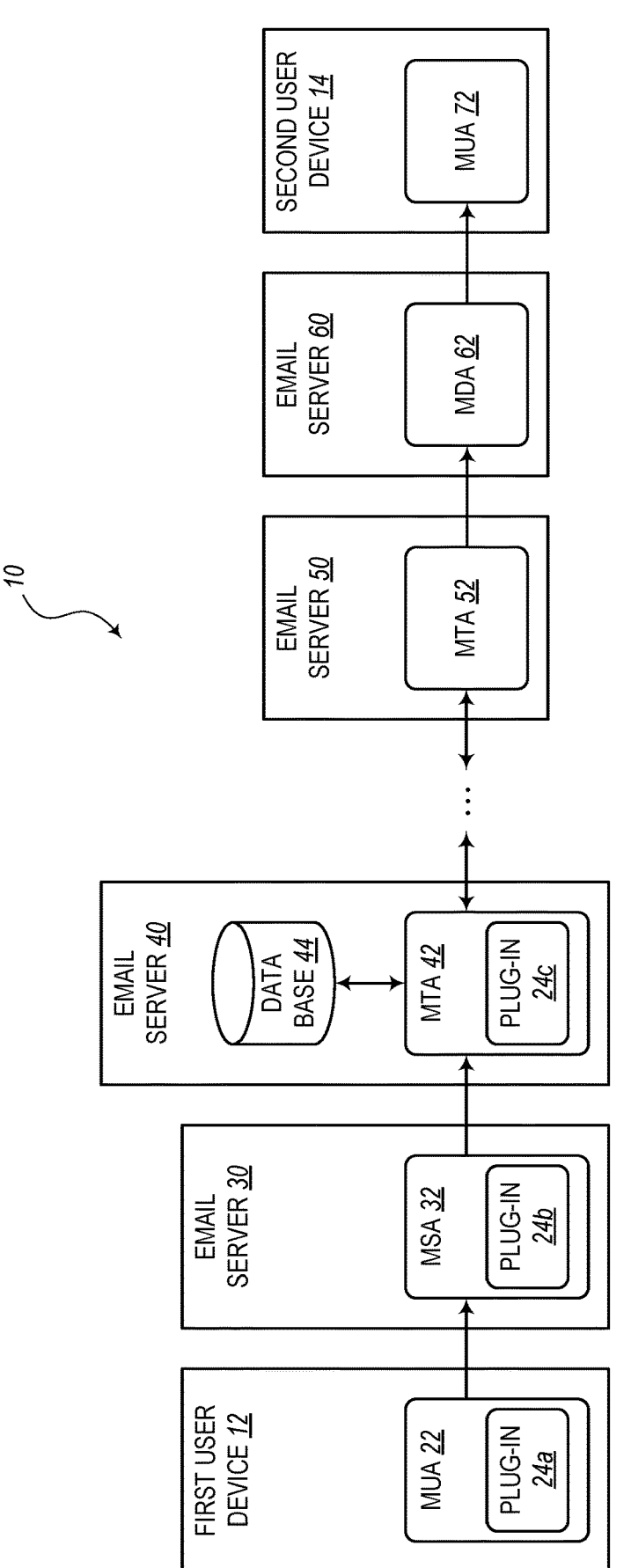
FIG. 2 is a block diagram illustrating the system of FIG. 1 involving multiple email servers between the sender's device and the recipient's device, according to various embodiments.

FIG. 2 is a block diagram illustrating an embodiment of the system 10 of FIG. 1. As illustrated, the system 10 shows the first user device 12 (sender's device) acting as a composing device or source of an email and the second user device 14 (recipient's device) acting as a receiver of the email, assuming that the email address of the recipient's device has been entered correctly. From the sender's device to the recipient's device, the email may be routed and forwarded by a plurality of email servers (e.g., email servers 30, 40, 50, and 60). For example, the email servers 30, 40 may be associated with a specific domain or email service related to at least the first user device 12, while the email servers 50, 60 may be associated with a specific domain or email service related to at least the second user device 14.

The first user device 12 may include a Message User Agent (MUA) 22 (e.g., mail user agent, email client, Web browser, etc.) configured to enable the sender 11 to send and receive email messages, manage email messages, compose email messages, enter one or more recipients' addresses, etc. The email server 30 may include a Message Submission Agent (MSA) 32 configured to control the submission of the email. Also, the email server 40 includes a Message Transfer Agent (MTA) 42 (e.g., mail relay, mail exchanger, etc.) configured to transfer the email along a route to the second user device 14. The email server 40 may further include a database 44 configured to store messages for multiple users in "mailboxes." The database 44 may also be configured to store address book information and contacts for multiple users. In some embodiments, the MTA 42 may be configured to communicate directly with the MUA 22. In some embodiments, the MSA 32 and MTA 42 may be arranged in a single email server and may operate with a Message Delivery Agent (MDA) (e.g., local delivery agent) for receiving email messages being delivered in the opposite direction to the first user device 12.

The MUA 22 includes a first plug-in 24a. The MSA 32 includes a second plug-in 24b. Also, the MTA 42 includes a third plug-in 24c. The plug-ins 24a, 24b, 24c may be configured to operate in conjunction with the email coordinator 18 for performing certain functions with respect to validating an email address and domain of a recipient and specifically performing this validation procedure before the email leaves the first user device 12. Communication among the first user device 12, email server 30, and email server 40 may conform with SMTP. Note, while described as plug-ins, those skilled in the art will appreciate any implementation is contemplated which can provide similar functionality to operate in conjunction with the email coordinator 18.

The email server 50 includes an MTA 52. The email server 60 includes an MDA 62 or local delivery agent. Also, the user device 14 includes an MUA 72. After validation of the recipient's email address, as described in the present disclosure, the MTA 42 of the email server 40 is configured to route the email message to the MTA 52 of the email server 50. The communication between the MTA 42 and the MTA 52 may be direct or may include one or more other email servers and MTAs. The MTA 52 and MDA 62 may be associated with an email system associated with the second user device 14 for receiving emails. Communication among the email server 50, email server 60, and second user device 14 may conform with Post Office Protocol (POP), POP3, and/or Internet Message Access Protocol (IMAP).

The email coordinator 18 may be a Certificate Authority (CA) or other types of trusted entities. That is, the various functionality described herein by the email coordinator 18 may be a service offered by a CA. The email coordinator 18 may be configured to perform any number of security functions (e.g., cybersecurity, certification, validation, etc.), such as providing certificates to entities, organization, enterprises, etc. regarding valid operations on the Internet 16. In addition to other security functions, the email coordinator 18 may be configured to validate (1) the domain and (2) the user before the email leaves the first user device 12. The MUA 22, MSA 32, and MTA 42 each have respective plug-ins 24a, 24b, and 24c, which can allow the validation systems to be arranged at two locations. That is, the local validation portions associated with the plug-ins 24a, 24b, 24c can work with the email coordinator 18 remotely in the cloud. It may be noted that the system 10, according to various implementations, may include any one or more of plug-ins 24a, 24b, 24c. For example, in some cases, the plug-in 24a may be sufficient to perform validation at the source itself (i.e., at the first user device 12), in conjunction with the email coordinator 18, if the plug-in 24a is incorporated in the MUA 22. However, in other cases, one or both of the plug-ins 24b, 24c may be used, depending on the email server configuration, for performing validation before the email leaves a domain associated with the email servers 30 and 40.

In some embodiments, the validation of the recipient email address and domain may be initiated in a number of ways. For example, the plug-in 24a may be configured to automatically begin validation, along with the email coordinator 18, when an address is first typed into an address field (or immediately after the sender 11 stops typing the email address or when a separator (e.g., ";" character) is typed in to represent a new email address to be entered). In another embodiment, the plug-in 24a may send a request to the email coordinator 18 when the sender 11 presses a "Send" button or when the sender 11 presses a "Validation" button (as described with respect to FIGS. 5 and 6). The plug-ins 24b, 24c may be used in various implementations after the sender 11 presses the Send button or Validation button. Of note, in any of these embodiments, the impact on user experience is minimal, if any, meaning all activity is performed in the background, giving the user added assurance that the recipient is valid.

Therefore, when the sender 11 adds the recipient johndoe@xyz.com into the address field, the plug-ins 24a, 24b, 24c can check with the cloud before letting the email leave. This validation procedure can be stand-alone protocol and/or incorporated into or running on top of an existing protocol (e.g., Simple Mail Transport Protocol (SMTP), etc.) to prevent any impact on existing solutions which may be widely deployed.

Thus, the email coordinator 18 may be configured to:

1. Validate each organization. i.e., domain (e.g., via Verified Mark Certificate (VMC), etc.)
2. Validate each user in the organization. To validate the users, the email coordinator 18 may be configured to execute various options, such as:

Option 1—periodically receive a list of email addresses;

Option 2—synchronize with Active Directory (AD) or Identity Access Management (IAM) solutions;

Option 3—validate each user in the organization with an S/MIME certificate. The email coordinator 18 may also be configured to perform updates when new users are onboarded or users are offboarded.
3. Maintain a directory of validated organizations (domains) and their validated users which will serve as a source of truth, in the cloud In addition, the plug-ins 24a, 24b, 24c may be configured to operate with different types of pop-ups, dialog boxes, etc., for allowing the user (e.g., sender 11) to make choices with respect to different detected situations. For example, if the email coordinator 18 detects that an email address has been entered that would direct the email outside of the sender's country or territory, the email coordinator 18 can ask the sender 11 if this is his or her intention. Some examples are described below with respect to FIGS. 5 and 6. Thus, the system 10 can provide pop-ups or other types of notification to the user if there is a failure in validation (e.g., "The user 'johndoe' at domain 'xyz.com' has not been detected," "This is not a valid domain," etc.).

It should be noted, therefore, that checking the validity of the identity of a recipient can avoid many problems, such as those described above in the example of the US military inadvertently sending emails to Mali. By checking validity, the systems and methods of the present disclosure are configured to provide a layer of security that has not been offered by conventional products. Also, the validation procedures can ensure the user (e.g., sender 11) that receipt of the email can be determined ahead of time to guarantee that the email will be delivered securely and to the correct recipient. Also, the validation procedures can assure the user that the email will not leave the user's control unless the recipient has been validated. Even further, this approach can replace the so-called return receipt process which is often circumvented where the receiver 13 chooses to avoid sending these notifications for various reasons.

The system 10 may work well in a transition where some organizations are validated (e.g., VMC) and use the email coordinator 18, and others do not. At some point in the future, there may be multiple domains that receive a VMC certificate and can use the email coordinator 18. For example, although admin@ml.gov and admin@mil.gov may both be valid email addresses, the email coordinator 18 may originally assume that both are valid. However, if one is certified and the other is not, it may be assumed at this point that the certified addresses are valid.

Figure 3:
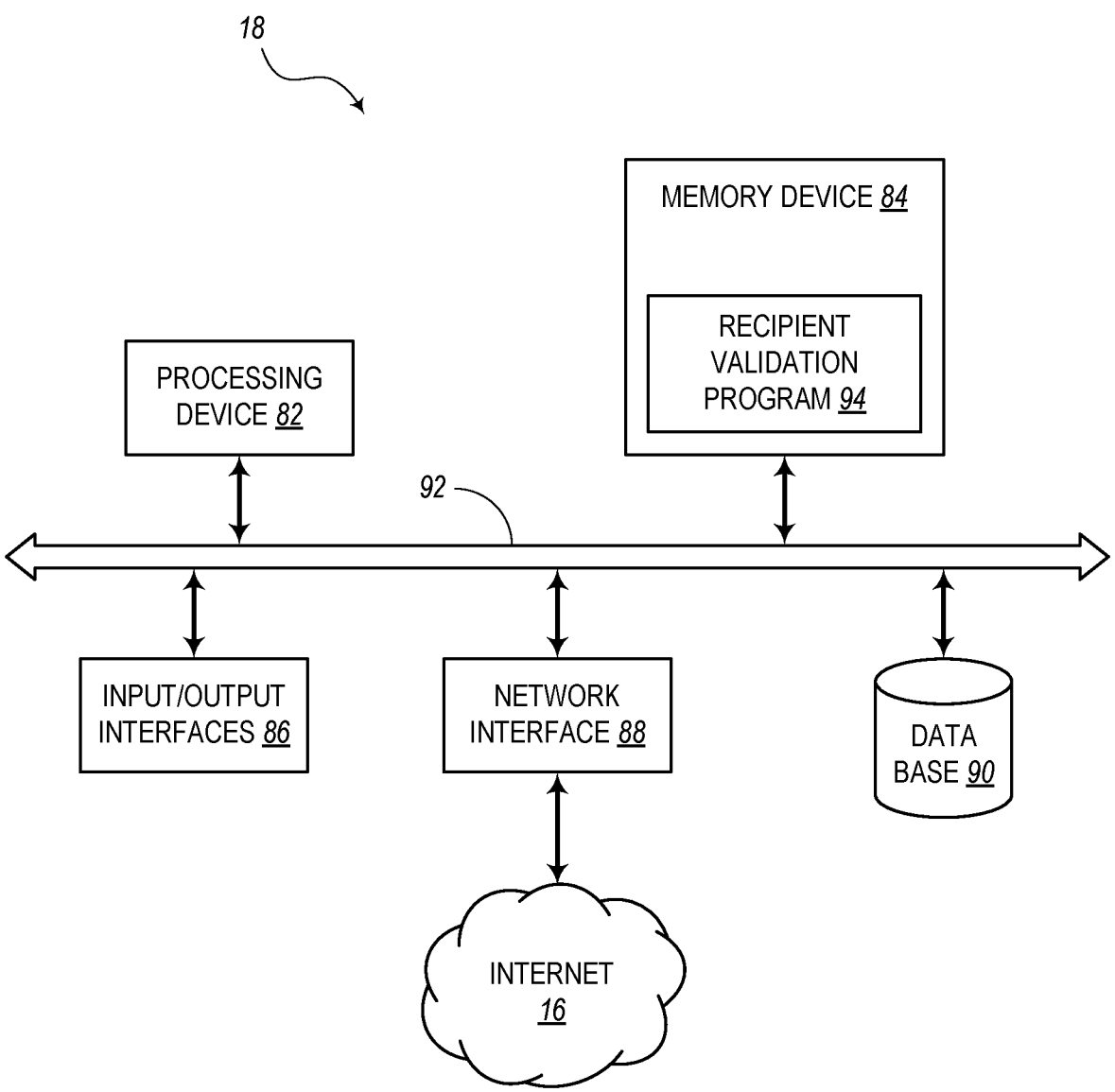
FIG. 3 is a block diagram illustrating the email coordinator shown in FIG. 1, according to various embodiments.

FIG. 3 is a block diagram illustrating an embodiment of the email coordinator 18 shown in FIG. 1. In some embodiments, the MSA 32 and/or MTA 42 may include the same or similar components as the email coordinator 18 shown in FIG. 3. In the illustrated embodiment, the email coordinator 18 may be a digital computing device that generally includes a processing device 82, a memory device 84, Input/Output (I/O) interfaces 86, a network interface 88, and a database 90. It should be appreciated that FIG. 3 depicts the email coordinator 18 in a simplified manner, where some embodiments may include additional components and suitably configured processing logic to support known or conventional operating features. The components (i.e., 82, 84, 86, 88, 90) may be communicatively coupled via a local interface 92. The local interface 92 may include, for example, one or more buses or other wired or wireless connections. The local interface 92 may also include controllers, buffers, caches, drivers, repeaters, receivers, among other elements, to enable communication. Further, the local interface 92 may include address, control, and/or data connections to enable appropriate communications among the components 82, 84, 86, 88, 90.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

In this embodiment, the email coordinator 18 may further include a recipient validation program 94, which may be implemented in any suitable form of hardware (e.g., in the processing device 82) and/or software or firmware (e.g., in the memory device 84). The recipient validation program 94 may be stored in a non-transitory computer-readable medium (e.g., memory device 82) and may include computer logic, code, commands, or instructions for enabling the processing device 82 to validate an email recipient before the email is launched into the cloud.

In some embodiments, the database 90 may be configured to store mailbox information and address book information for one or more users. For example, the address books may include the use of Directory Access. Also, the database 90 may be configured to store a list of valid domains and valid users within each domain. Furthermore, the database 90 can store VMCs. According to some embodiments, the database 90 may also store flags with certain email addresses (e.g., in the address books) where the flags may represent those email addresses that have previously been validated and/or those email addresses that have previously been indicated as being invalid, such that, if the address were to be entered again in the future, the validity of the address can be quickly determined.

According to some implementations, the recipient validation program 94 may be configured to validate whether or not a domain exists and then validate whether or not a recipient within that domain exists. If there are issues in this first step, the recipient validation program 94 may respond with "The domain is not valid," "This is not a valid domain," "The user cannot be found on this domain," or other suitable response. Next, the recipient validation program 94 may determine if the domain has a VMC or other type of certificate or certification. After this, the recipient validation program 94 may be configured to determine if the address has been previously entered by one or more users (and stored in the database 90). This can check for the correctness of the email address and, if the address is new, may include a response of "Are you sure you want to send this message to this recipient?". If it is a new address that has not been previously analyzed, the recipient validation program 94 may include checking for common typographical errors that may result in sending the email to an unintended recipient. If the user responds that they wish to continue with sending the email to the new address, the recipient validation program 94 may further include the step of asking the user if he or she wishes to add the email as a valid (or invalid) email address that can be flagged in the database 90.

Of note, FIG. 3 illustrates the email coordinator 18 as a single server. The email coordinator 18 can utilize one or more servers as well as be offered as a cloud service, such as via a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The email coordinator 18 can be via the cloud, as SaaS, etc.

Figures 4, 5:
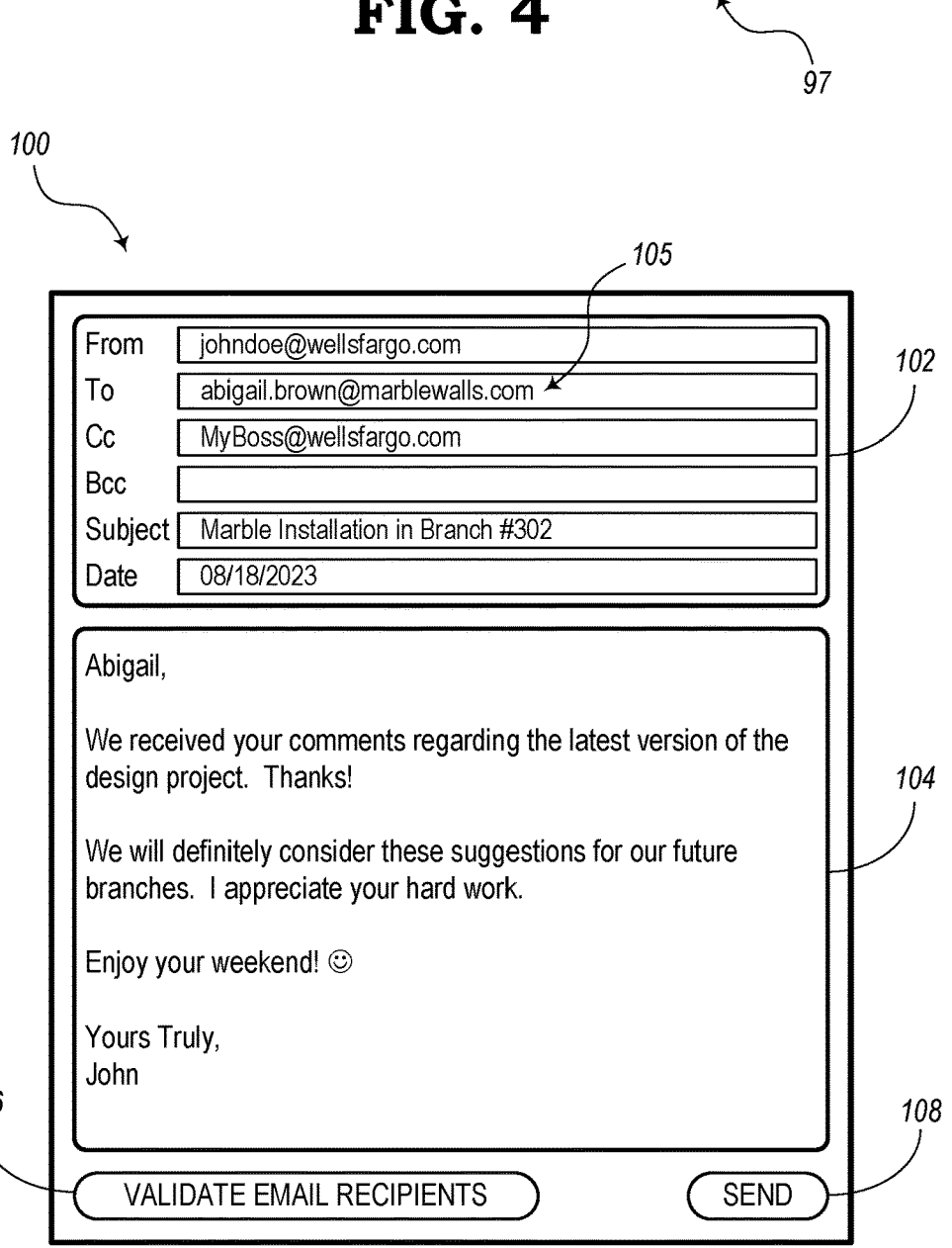
FIG. 4 is a table showing possible typographical issues that may result when a sender intends to send an email to certain Top-Level Domains (TLDs), according to various embodiments.
FIG. 5 is a diagram illustrating a display on a user interface showing aspects of an email creating system that enables a sender to create an email message, according to various embodiments.

FIG. 4 is a table 97 showing possible typographical issues that may result when a sender intends to send an email to certain Top-Level Domains (TLDs), but instead leaves out one character and inadvertently types in a country code TLD (ccTLD). For example, instead of typing ".com", the user may accidentally type in ".cm" (directed to the country of Cameroon), ".co" (directed to the country of Colombia), or ".om" (directed to the country of Oman). It should be noted that the table 97 shows just a handful of examples of possible errors that may occur. Of note, detecting errors is just one advantage of the email coordinator 18. Even when the email is properly typed, the email coordinator can provide the sender 11 additional assurances that the email will be properly received.

FIG. 5 is a diagram illustrating an example of a display 100 on a user interface showing aspects of an email creating system that enables a sender to create an email message. For example, the display 100 may be related to the MUA 22 shown in FIG. 2 for enabling the sender 11 to create an email. The display 100 shows a header portion 102 and a body portion 104. The header portion 102 allows the user to type in certain fields, while some fields may be automatically entered (e.g., the "From" field, the "Date" field, etc.). The user may enter one or more email addresses in a "To" field 105, one or more email addresses in a "Cc" field, and one or more email addressed in a "Bcc" field. The user can also add a subject (or title of the email) in a "Subject" field. As shown in FIG. 5, the user has corrected entered the address "abigail.brown@marblewalls.com" in the To field 105 in this example.

The display 100 of the email program may include a Validation button 106 and/or a Send button 108. In some embodiments, the Validation button 106 may be the only available option for the user. Then, after the validation process and determining that the addresses are valid, meaning both the domain and the user in the domain, the email program may provide feedback to the user (e.g., "The email addresses have been validated.") and may then display the Send button 108, allowing the user to send only after validation. Alternatively, both the Validation button 106 and Send button 108 may be presented as is shown in FIG. 5, allowing the user to skip the validation step if the user so chooses. However, in some embodiments, the system 10 may be configured to validate the addresses and domain, and send the email if the user presses the Send button 108.

The display 100, according to various embodiments of the present disclosure, may present the Validation button 106 with any suitable text, such as "Validate Email Recipients" (as shown) to allow the user to initiate the validation procedure. Thus, when the Validation button 106 is pressed (or when automatic validation is performed when the Send button 108 is pressed), the plug-ins 24a, 24b, and/or 24c are configured to send the email addresses entered in the To field, Cc field, and Bcc field to the email coordinator 18 to validate the addresses.

Figure 6:
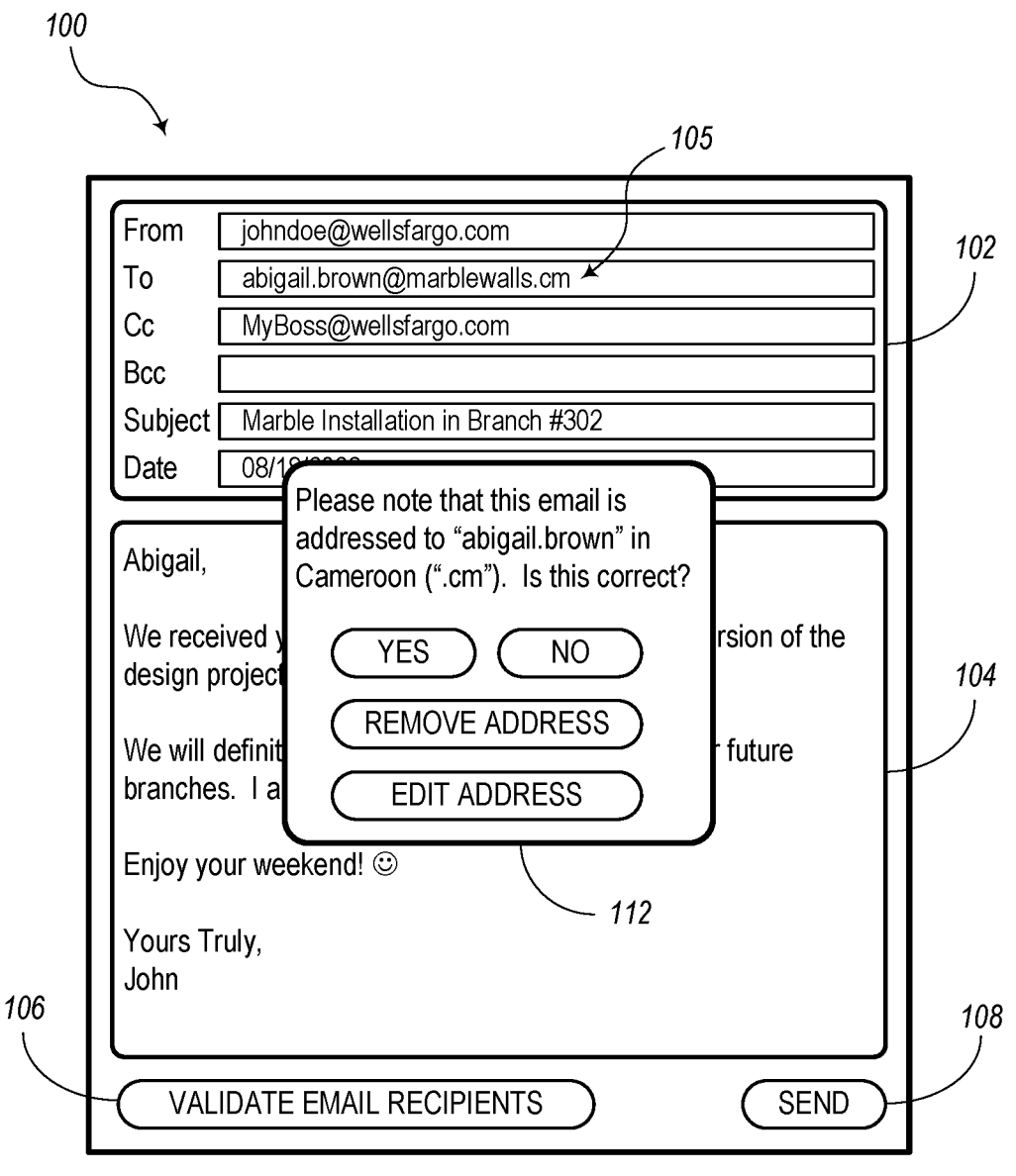
FIG. 6 is a diagram illustrating a pop-up window superimposed on the display of FIG. 5, according to various embodiments.

FIG. 6 is a diagram illustrating a pop-up window 112 that is superimposed on top of the display 100 when the email address is incorrectly entered in an address field (e.g., To field 105). In this example, the email address "abigail.brown@marblewalls.com" has been incorrectly entered as "abigail.brown@marblewalls.cm" where the TLD ".com" has been entered as a ccTLD ".cm" addressed to Cameroon. In this example, the email coordinator 18 detects an issue with the entered address and may use various forms of Machine Learning (ML) models to interpret text as being typographical errors based on various criteria. Thus, in the example shown in FIG. 6, the pop-up window 112 may describe the detected situation (i.e., the email is addressed to Cameroon) and may ask the user for clarification (i.e., "Is this correct?"). It should be noted that the email coordinator 18 (and plug-ins 24a, 24b, 24c) may be configured to provide any number, style, or text regarding various types of detected possible issues, any of which may be presented in pop-up windows, and may include any number of possible options for allowing the user to correct or clarify any possible issues. Also, in some cases, the user may be given the selection to enter certain email addresses in a database (e.g., "Add Email Address") that are acceptable in order that validation for those addresses would not be needed in the future.

The plug-in 24a can include the ability to present these different types of pop-ups to check a new address and keep track of previous recipients. By recording valid addresses and flagging certain email domains, recipients, ccTLDs, addresses, etc. as being valid or invalid, the system 10 can pre-store commonly used email addresses and/or commonly mistyped errors to catch various problems and ignore pre-validated addresses. In some cases, the plug-in 24a and/or email coordinator 18 may be configured to keep track of previous recipients and detect typographical errors based on an edit distance between a valid address and a new address that is close but different (e.g., mil.gov vs. ml.gov).

According to some embodiments, the email coordinator 18 may be configured to scan the body portion 104 of the email and find certain words or phrases. Then, the email coordinator 18 may check with the intended recipients and determine if there is a good correlation between the context of the email and the recipient. For example, the email coordinator 18 may be configured to discover that the email content includes military language in the body portion 104 and may see that the email is directed to a floral shop. In this case, the email coordinator 18 may display a pop-up (e.g., "This email appears to include sensitive military language. Do you wish to send this email to 'Donna Richardson' at 'Donna's Floral Shop' in Dublin, Ireland?").

Figure 7:
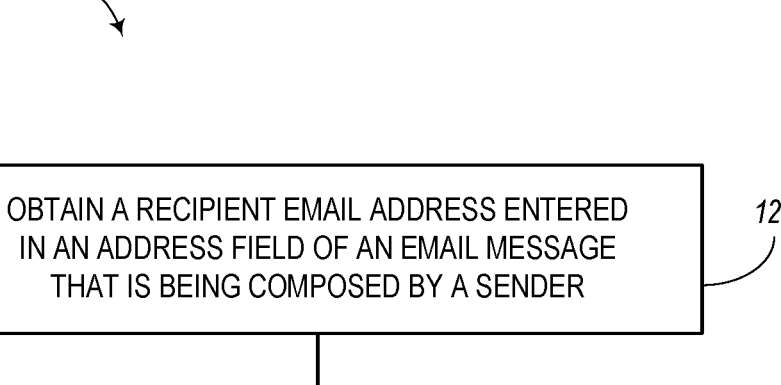
FIG. 7 is a flow diagram illustrating a method for validating an email message before it is sent, according to various embodiments.

FIG. 7 is a flow diagram illustrating an embodiment of a method 120 for validating an email message before it is sent. The method 120 includes a step of obtaining a recipient email address entered in an address field of an email message that is being composed by a sender, as indicated in block 122. The method 120 further includes a step of checking validity of the recipient email address and a domain associated with the recipient email address, to identify one or more possible issues in the recipient email address before the email message is sent, as indicated in block 124.

Upon identifying one or more possible issues in the recipient email address (block 124), the method 120 may further include a step of alerting the sender to the one or more possible issues. In some embodiments, the method 120 may also include the steps of a) allowing the sender to enter an option to flag the recipient email address as either valid or invalid, and b) storing a valid flag or invalid flag along with the recipient email address based on the option entered by the sender. The step of alerting the sender to the one or more possible issues may alternatively include the steps of a) communicating the one or more possible issues in a pop-up window, and b) presenting one or more selectable buttons in the pop-up window for receiving input from the sender.

The step of checking the validity of the recipient email address and the domain (block 124) may include the steps of a) comparing the recipient email address with one or more email addresses previously stored in a database, and b) based on the step of comparing the recipient email address with the one or more email addresses, determining a likelihood that the recipient email address includes a typographical error. The step of determining the likelihood of a typographical error may include the step of analyzing one or more of a Top-Level Domain (TLD), a country code TLD (ccTLD), a root domain, and a look-alike domain of the recipient email address and the one or more email addresses. In some embodiments, the steps of comparing and determining may involve Machine Learning (ML) procedures.

According to some implementations, the method 120 may also include the steps of a) extracting a domain from a first portion of the recipient email address to determine if the domain is valid and exists, and b) extracting a recipient from a second portion of the recipient email address to determine if the recipient is valid and exists. The method 120 may also include the steps of a) determining a certification status of the domain, and b) informing the sender whether or not the domain includes a certificate issued by a Certification Authority (CA).

The method 120, in some embodiments, may include the steps of obtaining the recipient email address and checking the validity of the recipient email address after the sender has a) pressed a first button associated with sending the email message, b) pressed a second button associated with validating an email recipient, or c) entered the recipient email address in the address field. The method 120 may be configured in a memory device or other suitable non-transitory computer-readable medium (e.g., in software or firmware) and may be associated with one or more plug-ins associated with one or more of a Message User Agent (MUA), a Message Submission Agent (MSA), and a Message Transfer Agent (MTA). The method 120 may include sending the email message after validation is confirmed and the one or more possible issues have been resolved. In some implementations, the method 120 may be executed on top of the Simple Mail Transport Protocol (SMTP).

In some embodiments, the method 120 may also include storing a list of validated recipients (e.g., in a database in the cloud) for each of one or more domains. The method 120 may be associated with a cloud-based server that operates with one or more plug-ins associated with an email program on a user's device, MUA, MSA, MTA, or MDA, whereby the plug-ins may be configured to send a request to the server for validation purposes, and results of the validation are provided to the plug-in associated with the user device for controlling whether or not the message is sent. The email program may be configured such that it does not send the email message until it gets the go-ahead from the corresponding validation program (e.g., recipient validation program 94).

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A non-transitory computer-readable medium configured to store computer logic having instructions that enable a processing device to perform steps of:

obtaining a recipient email address entered in an address field of an email message that is being composed by a sender; and checking validity of the recipient email address and a domain associated with the recipient email address, by communicating with a certificate authority (CA)-based email coordinator that maintains a directory of validated domains and validated users, to identify one or more possible issues in the recipient email address before the email message is permitted to leave a sender's device, wherein the checking further comprises applying machine learning models to analyze both the recipient address and contextual content of the email body to determine consistency between the recipient domain and the content, wherein determining consistency comprises: (i) scanning the email body to identify one or more words or phrases indicative of a message context, (ii) determining, based at least in part on the directory of validated domains and validated users, whether the identified message context correlates with the recipient domain or a recipient identity associated with the recipient email address, and (iii) when the correlation fails a threshold, generating an alert that requests confirmation that the sender intends to send the email message to the recipient email address.

2. The non-transitory computer-readable medium of claim 1, wherein, upon identifying one or more possible issues in the recipient email address, the instructions further enable the processing device to perform a step of alerting the sender to the one or more possible issues.

3. The non-transitory computer-readable medium of claim 2, wherein the instructions further enable the processing device to perform steps of:

allowing the sender to enter an option to flag the recipient email address as either valid or invalid; and storing a valid flag or invalid flag along with the recipient email address based on the option entered by the sender.

4. The non-transitory computer-readable medium of claim 2, wherein the step of alerting the sender to the one or more possible issues includes steps of:

communicating the one or more possible issues in a pop-up window; and presenting one or more selectable buttons in the pop-up window for receiving input from the sender.

5. The non-transitory computer-readable medium of claim 1, wherein the step of checking validity of the recipient email address includes steps of:

comparing the recipient email address with one or more email addresses previously stored in a database; and based on the step of comparing the recipient email address with the one or more email addresses, determining a likelihood that the recipient email address includes a typographical error based at least in part on edit-distance measures and detection of look-alike domains.

6. The non-transitory computer-readable medium of claim 5, wherein the step of determining the likelihood of a typographical error includes a step of analyzing one or more of a Top-Level Domain (TLD), a country code TLD (ccTLD), a root domain, and a look-alike domain of the recipient email address and the one or more email addresses.

7. The non-transitory computer-readable medium of claim 5, wherein the steps of comparing and determining involve Machine Learning (ML) procedures, including text recognition models trained to detect typographical patterns and domain substitutions.

8. The non-transitory computer-readable medium of claim 1, wherein the instructions further enable the processing device to perform steps of:

extracting a domain from a first portion of the recipient email address to determine if the domain is valid and exists; and extracting a recipient from a second portion of the recipient email address to determine if the recipient is valid and exists.

9. The non-transitory computer-readable medium of claim 8, wherein the instructions further enable the processing device to perform steps of:

determining a certification status of the domain; and informing the sender whether or not the domain includes a certificate issued by a Certification Authority (CA), including a Verified Mark Certificate (VMC), an S/MIME certificate, or validation obtained through synchronization with an Identity Access Management (IAM) or Active Directory (AD) service.

10. The non-transitory computer-readable medium of claim 1, wherein the instructions further enable the processing device to perform the steps of obtaining the recipient email address and checking validity of the recipient email address after the sender has a) pressed a first button associated with sending the email message, b) pressed a second button associated with validating an email recipient, or c) entered the recipient email address in the address field.

11. The non-transitory computer-readable medium of claim 1, wherein the instructions include one or more plug-ins associated with one or more of a Message User Agent (MUA), a Message Submission Agent (MSA), and a Message Transfer Agent (MTA), including a Verified Mark Certificate (VMC), an S/MIME certificate, or validation obtained through synchronization with an Identity Access Management (IAM) or Active Directory (AD) service.

12. The non-transitory computer-readable medium of claim 1, wherein the instructions further enable the processing device to perform a step of sending the email message after validation is confirmed and the one or more possible issues have been resolved, wherein a send control element is withheld from the user interface until successful validation occurs.

13. The non-transitory computer-readable medium of claim 1, wherein the computer logic is executed on top of the Simple Mail Transport Protocol (SMTP).

14. An email coordinator comprising:

a processing device, and a memory device configured to store a computer program having instructions that, when executed, enable the processing device to obtain a recipient email address entered in an address field of an email message that is being composed by a sender, and check validity of the recipient email address, by communicating with a certificate authority (CA)-based email coordinator that maintains a directory of validated domains and validated users, to identify one or more possible issues in the recipient email address before the email message is permitted to leave a sender's device, wherein the checking further comprises applying machine learning models to analyze both the recipient address and contextual content of the email body to determine consistency between the recipient domain and the content, wherein determining consistency comprises: (i) scanning the email body to identify one or more words or phrases indicative of a message context, (ii) determining, based at least in part on the directory of validated domains and validated users, whether the identified message context correlates with the recipient domain or a recipient identity associated v with the recipient email address, and (iii) when the correlation fails a threshold, genera an alert that requests confirmation that the sender intends to send the email message to the recipient email address.

15. The email coordinator of claim 14, wherein the email coordinator is arranged in a cloud-based email server.

16. The email coordinator of claim 14, wherein, upon identifying one or more possible issues in the recipient email address, the instructions further enable the processing device to perform steps of:

alerting the sender to the one or more possible issues;

allowing the sender to enter an option to flag the recipient email address as either valid or invalid; and storing a valid flag or invalid flag along with the recipient email address based on the option entered by the sender.

17. The email coordinator of claim 14, wherein checking validity of the recipient email address includes steps of:

comparing the recipient email address with one or more email addresses previously stored in a database; and based on the step of comparing the recipient email address with the one or more email addresses, determining a likelihood that the recipient email address includes a typographical error in one or more of a Top-Level Domain (TLD), a country code TLD (ccTLD), a root domain, and a look-alike domain of the recipient email address with respect to the one or more email addresses.

18. A method comprising steps of:

obtaining a recipient email address entered in an address field of an email message that is being composed by a sender; and checking validity of the recipient email address, by communicating with a certificate authority (CA)-based email coordinator that maintains a directory of validated domains and validated users, to identify one or more possible issues in the recipient email address before the email message is permitted to leave a sender's device, wherein the checking further comprises applying machine learning models to analyze both the recipient address and contextual content of the email body to determine consistency between the recipient domain and the content, wherein determining consistency comprises: (i) scanning the email body to identify one or more words or phrases indicative of a message context, (ii) determining, based at least in part the directory of validated domains and validated users, whether the identified message context correlates with the recipient domain or a recipient identity associated with the recipient email address, and (iii) when the correlation fails a threshold, generating an alert that requests confirmation that the sender intends to send the email message to the recipient email address.

19. The method of claim 18, further comprising steps of:

extracting a domain from a first portion of the recipient email address to determine if the domain is valid and exists;

extracting a recipient from a second portion of the recipient email address to determine if the recipient is valid and exists;

determining a certification status of the domain; and informing the sender whether or not the domain includes a certificate issued by a Certification Authority (CA), wherein the CA maintains a cloud-based directory of validated domains and validated users that is continuously updated to reflect onboarding and offboarding of users.

20. The method of claim 18, wherein the steps of obtaining the recipient email address and checking validity of the recipient email address are executed in response to the sender a) pressing a first button associated with sending the email message, b) pressing a second button associated with validating an email recipient, or c) entering the recipient email address in the address field.

* * * * *